(12) United States Patent
Willers et al.

(10) Patent No.: US 11,586,855 B2
(45) Date of Patent: Feb. 21, 2023

(54) METHOD FOR DETERMINING A CONFIDENCE VALUE OF A DETECTED OBJECT

(71) Applicant: Robert Bosch GmbH, Stuttgart (DE)

(72) Inventors: Oliver Willers, Korb (DE); Sebastian Sudholt, Neuenstadt Am Kocher (DE); Shervin Raafatnia, Gerlingen (DE); Stephanie Abrecht, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 31 days.

(21) Appl. No.: 16/907,878

(22) Filed: Jun. 22, 2020

(65) Prior Publication Data

US 2020/0410297 A1 Dec. 31, 2020

(30) Foreign Application Priority Data

Jun. 27, 2019 (DE) .......................... 102019209372.8
Jun. 28, 2019 (DE) .......................... 102019209462.7

(51) Int. Cl.
*G06K 9/62* (2022.01)
*G06N 3/08* (2006.01)
*G06N 3/04* (2006.01)
*G06V 10/44* (2022.01)
*G06V 20/56* (2022.01)

(52) U.S. Cl.
CPC ......... *G06K 9/6265* (2013.01); *G06K 9/6256* (2013.01); *G06N 3/04* (2013.01); *G06N 3/08* (2013.01); *G06V 10/44* (2022.01); *G06V 20/56* (2022.01)

(58) Field of Classification Search
CPC ..................... G06V 10/44; G06T 2207/20084
See application file for complete search history.

(56) References Cited

U.S. PATENT DOCUMENTS

2019/0258878 A1* 8/2019 Koivisto ................ G06V 10/25

OTHER PUBLICATIONS

R. Anati, D. Scaramuzza, K. G. Derpanis and K. Daniilidis, "Robot localization using soft object detection," 2012 IEEE International Conference on Robotics and Automation, 2012, pp. 4992-4999, doi: 10.1109/ICRA.2012.6225216. (Year: 2012).*
Lee, et al.": A Smple Uified Famework for Dtecting Ot-of-Dstribution Samples and Adversarial Attacks", 32nd Conf. on Neural Information Processing Systems (NeurIPS 2018, Canada), 2018, pp. 1-11; https://proceed ings.neurips.cc/paper/2018/hash/abdeb6f 575ac5c6676b 7 4 7bca8d09cc2-Abstract.html.

(Continued)

*Primary Examiner* — Ross Varndell
(74) *Attorney, Agent, or Firm* — Norton Rose Fulbright US LLP; Gerard Messina (57) ABSTRACT

A method is indicated for determining a confidence value of an object of a class detected in an input image with the aid of a trained neural network, including: producing an activation signature for the class of the detected object using a plurality of output images of a layer of the neural network, the input image being provided to the input of the neural network; scaling the activation signature to the dimension of the input image; comparing an object portion of the scaled activation signature with an activation signature distribution of all objects of the same class of a training data set of the neural network in order to determine the confidence value.

13 Claims, 3 Drawing Sheets

(56) References Cited

OTHER PUBLICATIONS

McAllister, et al.: "Robustness to Out-of-Distribution Inputs via Task-Aware Generative Uncertainty", arXiv:1812.10687v1, (2018), pp. 1-8, https://arxiv.org/abs/1812.10687v1 (accessed on Nov. 30, 2022).

Selvaraju, et al.: "Grad-CAM: Visual Explanations from Deep Networks via Gradient-based Localization", 2017 IEEE International Conference on Computer Vision (ICCV), (2017), pp. 618-626, https://ieeexplore.IEEE.org/document/8237336.

* cited by examiner

METHOD FOR DETERMINING A CONFIDENCE VALUE OF A DETECTED OBJECT

CROSS REFERENCE

The present application claims the benefit under 35 U.S.C. § 119 of German Patent Application Nos. DE 102019209372.8 filed on Jun. 27, 2019, and DE 102019209462.7 filed on Jun. 28, 2019, which are both expressly incorporated herein by reference in their entireties.

FIELD

The present invention relates to a method for determining a confidence value of an object of a class, detected by a neural network, in an input image.

BACKGROUND INFORMATION

For controlling at least partially automated systems, such as e.g., self-driving vehicles or robots as examples of mobile platforms, deep learning methods are tested and developed further. An essential component of such at least partially automated systems is their ability to perceive complex situations with respect to their environment. A precondition for the safe and effective operation of such an at least partially automated system is the interpretation of the environment and the estimation of the state of this environment, e.g., for decision processes such as trajectory planning and control, deep learning methods, that is, the use of deep neural networks, which are specifically trained, promising a great potential for solving such tasks.

SUMMARY

A fundamental problem with respect to the safety of such at least partially automated systems, which use deep neural networks for example, is that the ability of the neural network to solve the specific task following the training could only be estimated if the input data in the application case were to stem from the same distribution as the training data set with which the network was tested and trained. Consequently, DNNs (deep neural network), which are used for object recognition tasks, are only able to say what they saw, but now how certain they are about it.

For example for object recognition, however, knowledge regarding the reliability of an object recognition model is of the greatest importance for safe, at least partially automated, driving.

Currently, in connection with at least partially automated driving, modern plausibility checks are normally limited to comparing several sensor systems or to the analysis of the input data on the basis of expert knowledge, for example in order to recognize difficult conditions in the environment such as fog for optical sensors or reduced data quality such as a blur due to movement in an individual image or in an image sequence.

Thus, using a data set, the aim is to recognize in the application case for example anomalies in the determination of a representation of an environment and of the objects detected therein if the representation of the environment is performed by a deep neural network.

According to one aspect of the present invention, a method is provided for determining a confidence value, a device as well as a computer program product and a computer-readable storage medium according to the present invention, which have at least in part the mentioned effects. Advantageous developments of the present invention are described herein.

The present invention is based on the recognition that deviations in the detection of objects, which are assigned to a class, may be identified in the application case by the fact that the recognition patterns occurring in the detection are compared to an averaged recognition pattern, which was ascertained using a plurality of training data of the deep neural network. Possible deviations may be quantified in order to obtain a confidence value for the detection of an object in the application case.

According to one aspect of the present invention, an example method is provided for determining a confidence value of an object of a class detected in an input image with the aid of a trained neural network.

In a step of the example method, an activation signature is produced for the class of the detected object using a plurality of output images of a hidden layer of the neural network, the input image being provided to an input of the neural network.

In another step, the activation signature is scaled to a dimension of the input image. In a further step, an object portion of the scaled activation signature is compared with an activation signature distribution of all objects of the same class of a training data set of the neural network in order to determine the confidence value.

It is thus possible to check a plausibility of the predictions of a trained deep neural network (DNN) in object recognition tasks by comparing the activation signature from the input images of the application case with an averaged activation signature distribution from training data for the same object class. Deviations between the training data and the input data during the application case are thereby recognized.

The confidence value may indicate a measure value that quantifies anomalies in the detection and/or classification of objects and thus supports the object recognition by way of a neural network in that, in addition to the detection and/or classification of an object, a further item of information is indicated about a trustworthiness of the object recognition. Even if an object was correctly detected and also correctly classified, such a confidence value is able to indicate the reliability of the method used.

A trained neural network in this context is a neural network that was suitably trained in order to solve a designated task using new input data. A neural network provides a framework for many different algorithms for machine learning, for collaboration and for processing complex data inputs, for example. Such neural networks learn to perform tasks on the basis of examples typically without having been programmed with task-specific rules.

Such a neural network is based on a collection of connected units or nodes, which are called artificial neurons. Each connection is able to transmit a signal from one artificial neuron to another. An artificial neuron that receives a signal is able to process it and then activate further artificial neurons connected to it.

In conventional implementations of neural networks, the signal in a connection of artificial neurons is a real number, and the output of an artificial neuron is calculated by a non-linear function of the sum of its inputs. The connections of the artificial neurons typically have a weighting that is adapted with progressive learning. The weighting increases or decreases the strength of the signal in a connection. Artificial neurons may have a threshold so that a signal is output only if the overall signal exceeds this threshold.

Typically, a plurality of artificial neurons is combined in layers. Different layers may perform different types of transformations for their inputs. Signals migrate from the first layer, the input layer, to the final layer, the output layer, possibly after running through the layers repeatedly.

In addition to the explanations of a neural network, the structure of a convolutional neural network is made up of one or multiple convolutional layers, possibly followed by a pooling layer. The sequence of layers may be used with or without normalization layers (e.g., batch normalization) zero padding layers, dropout layers and activation functions such as e.g. rectified linear unit ReLU, sigmoid function, tank function or softmax function.

These units may repeat in principle as often as desired. In the case of sufficient repetitions, one then speaks of deep convolutional neural networks. Such a neural convolutional network may have a sequence of layer, which scan the input grids down to a lower resolution in order to obtain the desired information and to store the redundant information.

If one describes the data of such a neural network using coordinate data and feature data, the feature data being assigned to the coordinate data, in convolutional operations the number of the coordinate data will typically decrease, while the number of feature data, which are assigned to the coordinate data, will increase. The feature data are typically combined into so-called feature maps within the layers of the neural network.

The final convolutional layer extracts the most complex features, which are situated in multiple feature maps ($A^k_{ij}$) and which generate output images if input images are applied at the input of the neural network. The final convolutional layer furthermore retains spatial information, which is lost in possible subsequent fully connected layers, the fully connected layers being used for the classification.

If an input image is applied at the input of such a neural network, output images of the feature maps result in the different hidden layers and the corresponding feature maps, which may respectively characterize certain features of the current input image. In neural convolutional networks, the number of feature maps is greatest in the final convolutional layer, before the coordinate dimension becomes one-dimensional for example for the classification with the fully connected layers, so that preferably the final convolutional layer of the neural network may be selected for producing the activation signature. The selection of the layer is in particular free and may be adapted to or optimized for particular circumstances.

In successive convolutional layers, the feature map becomes progressively smaller in terms of the number of pixels in relation to the size of the map. For a comparison of an activation signature, which is produced on the basis of such a smaller feature map of a convolutional layer, with an input image and the object of a class detected in it, the activation signature is scaled to the dimension of the input image. From such a scaled activation signature of a plurality of output images (output data of the feature maps), an object portion, in which the classified object was detected, is compared with an activation signature distribution of all objects of the same class of a training data set in order to determine a confidence value. For this comparison, it is possible to perform in particular another scaling of the object portion since the detected objects may have different sizes in the input image.

The described scalings may also refer respectively to a defined size or to the bounding box.

This scaling is necessary since the sizes of the predicted object normally vary and must be standardized before the method can be applied.

The object portion may be scaled in relation to the bounding box of the predicted object.

This method may be used in any pretrained neural convolutional network without modifying or retraining it.

According to one aspect, the present invention provides for the object portion of the scaled activation signature to comprise a portion of the input image, in which at least portions of the object of the same class were detected.

The object portion may in particular comprise the entire detected object.

According to one aspect, the present invention provides for the object portion of the scaled output images to comprise a rectangular portion of the scaled output images, which is constructed around the detected object of a class.

Such a rectangular portion (bounding box) facilitates further image or data processing steps.

According to one aspect, the present invention provides for the activation signature of the detected object of a class to be determined using the following steps.

In one step of the example method, a relevance of each individual output image, of the plurality of the output images of the layer of the neural network, is calculated for classifying the detected object using a gradient method.

In a further step, each of the output images is weighted with its respective relevance.

In a further step, the plurality of the weighted output images is combined.

In a further step, an activation function is applied to the combined plurality of the weighted output images in order to amplify the features that have a positive influence on the classification in order to determine the activation signature.

Ascertaining the relevance of each individual output image achieves the result of emphasizing in the later weighting those output images of a layer in the combination of the plurality of the weighted output images that have the greatest influence on the categorization of this detected object. Thus it is possible to map those regions within the object portion that resulted in the respective categorization. If regions outside the object portion were used for the categorization, then this represents an anomaly.

The combination of the plurality of the weighted output images may be performed for example by a pixel-by-pixel addition of pixels whose positions correspond.

In particular, it is possible to describe the relevance of an individual output image for the classification of the detected object using a single value in that the relevance determined using the gradient method is averaged across all pixels of the output image.

According to a further aspect, the present invention provides for the activation signature of the detected object of a class to be determined using the following steps.

In one step, the relevance of each individual output image, of the plurality of the output images of a layer of the neural network, is calculated for classifying the detected object, in that a gradient of a class output value of the neural network is determined, which refers to the output images of the plurality of output images.

In a further step, the gradient of the class output value is averaged across all pixels of the respective output image for determining a relevance of each individual output image of the plurality of the output images of the layer of the neural network.

In a further step, each of the output images is weighted with its respective relevance. In a further step, all pixel values of the weighted output images, which are situated at corresponding positions in the weighted output images, are summed up; and in a further step, the summed up pixel values, which have a positive influence on the classification, are amplified by setting all negative values of the summed up pixel values to zero in order to determine an activation signature.

Determining the relevance of an individual output image of a layer by a gradient method corresponds to the greatest possible extent to the gradient-weighted class activation mapping (Grad-CAM). And it can also be performed using the Grad-CAM method. Grad-CAM is a technology for localizing and visualizing class-differentiating features in an input image, which makes predictions about each convolutional neural network more transparent.

It is possible to calculate the relevance $\alpha_k^c$ of each individual output image of the plurality k of the output images of the layer of the neural network using formula 1:

$$\alpha_k^c = \frac{1}{Z}\sum_i\sum_j \frac{\partial y^c}{\partial A_{ij}^k}; \qquad \text{formula 1}$$

Here, index c stands for the class of the detected object; i and j are the indices of the pixels of the output image across which averaging is performed using the double sum and scaling factor Z; and the partial derivation of the class output value $y^c$ is summed up according to output images $A_{ij}^k$.

In other words, in the case of an input image and its class output value $y^c$ for the class c, the gradients of the class output value (scores) are calculated with respect to the outputs of the feature maps, the scores being set to zero for all other classes, and averaged globally across the pixels in the respective feature maps, in order to obtain the relevance $\alpha_k^c$ of each feature map for the object class.

The activation signature may be described by the following formula 2, $$L_{i,j}^c = \text{ReLU}(\Sigma_k A_{i,j}^k \alpha_k^c); \qquad \text{formula 2}$$

where $L_{i,j}^c$ is the activation signature for the class c with the pixel indices i,j.

For this purpose, over a plurality k of output images $A_{i,j}^k$ with their pixel indices i, j multiplied summed with relevance $\alpha_k^c$.

In other words, the output images (the output of the feature maps) are weighted with their respective relevance, are combined and followed by a rectified linear unit (ReLU) for intensifying features having a positive influence on the class determination. The result is a rough activation signature (heatmap), on which the input image may be superimposed in order to emphasize important image portions.

According to one aspect of the present invention, a method is provided for determining the activation signature distribution for a class of detected objects in a plurality of input images of a training data set having associated classes of the objects in the respective input images, which has the following steps.

In one step, a plurality of activation signatures is calculated, as explained above, for all detected objects of a class in the plurality of input images.

In another step, each of the activation signatures is scaled to the dimension of the input image.

In a further step, each object portion of the object detected in the scaled activation signature is scaled to a uniform dimension.

In a further step, a probability distribution is calculated for each pixel of the scaled object portion of the scaled activation signatures using all detected objects of the same class of the training data set, an average value and a variance being determined for each pixel of the scaled activation signatures for determining the activation signature distribution.

According to one aspect, the present invention provides for each pixel of the object portion of the scaled activation signature to be compared with every corresponding pixel of the activation signature distribution in order to determine a probability that a pixel of the object portion stems from the distribution of the same pixel of the activation signature distribution and for calculating an average value of these probabilities for all pixels of the object portion for determining the confidence value.

It is possible to determine the confidence value using this simple method.

According to one aspect, the present invention provides for the comparison for determining the confidence value to be determined using a log-likelihood function of the object portion of the scaled activation signature in comparison with the activation signature distribution of the class of the detected object.

This calculation using the log-likelihood function makes it possible to perform another, further determination of the confidence value.

According to one aspect, the present invention provides for the comparison of the scaled activation signature of the classified object with the activation signature distribution to be performed for determining the confidence value using the following relationship, which may be described by formula 3:

$$\ln p(x|\mu,\Sigma) = -\frac{1}{2}[\ln(|\Sigma|) + (x-\mu)_T \Sigma^{-1}(x-\mu) + k \ln(2\pi)]; \qquad \text{formula 3}$$

Formula 3 calculates the log-likelihood function, where x is a vector representation of the object portion of the scaled activation signature and has k number of pixel elements of the object portion of the scaled activation signature; μ is the vector representation of the average values of the pixels of the activation signature distribution having k number of elements; and Σ is the k×k sized covariance matrix of the activation signature distribution. This means that μ and Σ are calculated using the training data set.

In this instance, k is the number of pixels overall, that is, n times m for an x and a y direction of the spatial components of a feature map for example.

According to one aspect, the present invention provides for generating a signal if the confidence value is smaller than a threshold value for the confidence value, the threshold value having been ascertained using training data or test data.

Such a threshold value makes it possible for example to emit an alarm signal as a function of the current situation and the current confidence value.

It is possible to determine a threshold on the basis of the confidence values that were ascertained in training and test data sets.

If for new observations the confidence value, which may be determined for example using ln p, is below a threshold value, this may indicate an anomaly. A low confidence value indicates that the system is entering a situation for which it was not trained.

The described method may furthermore also be used as a development tool in order for example to identify for further analysis results that are not plausible, already during the training of a neural network.

According to one aspect, the present invention provides for the confidence value to be provided as a weighting factor for a situation analysis method.

The confidence value thus provides the situation analysis method with a parameter, by which results of the detection and/or of the classification of objects using the neural network may be evaluated and compared with other information about the environment obtained by further sensors.

In the process, for example, an object detected by the neural network, where the determination is associated with a high confidence value, may be weighted more heavily, compared to other sensor data, than in the case of low confidence values.

According to one aspect, the present invention provides for transmitting a control signal for controlling an at least partially automated vehicle and/or a warning signal for warning a vehicle occupant as a function of the magnitude of the confidence value.

A corresponding example with respect to an object correctly classified as a pedestrian, in which however the position of the pedestrian has a low confidence value, was already discussed above.

In accordance with the present invention, a device is provided that is designed to carry out a method as described above. Such a device makes it possible to integrate the method readily into various systems.

In accordance with the present invention, a computer program is provided, which comprises commands that prompt a computer, when executing the computer program, to carry out one of the methods described above. Such a computer program allows for the described method to be used in various systems.

In accordance with the present invention, a machine-readable storage medium is provided on which the computer program described above is stored.

BRIEF DESCRIPTION OF EXAMPLE EMBODIMENTS

Exemplary embodiments of the present invention are depicted in FIGS. 1 through 3 and are explained in greater detail below.

DETAILED DESCRIPTION OF EXAMPLE EMBODIMENTS

Figure 1:
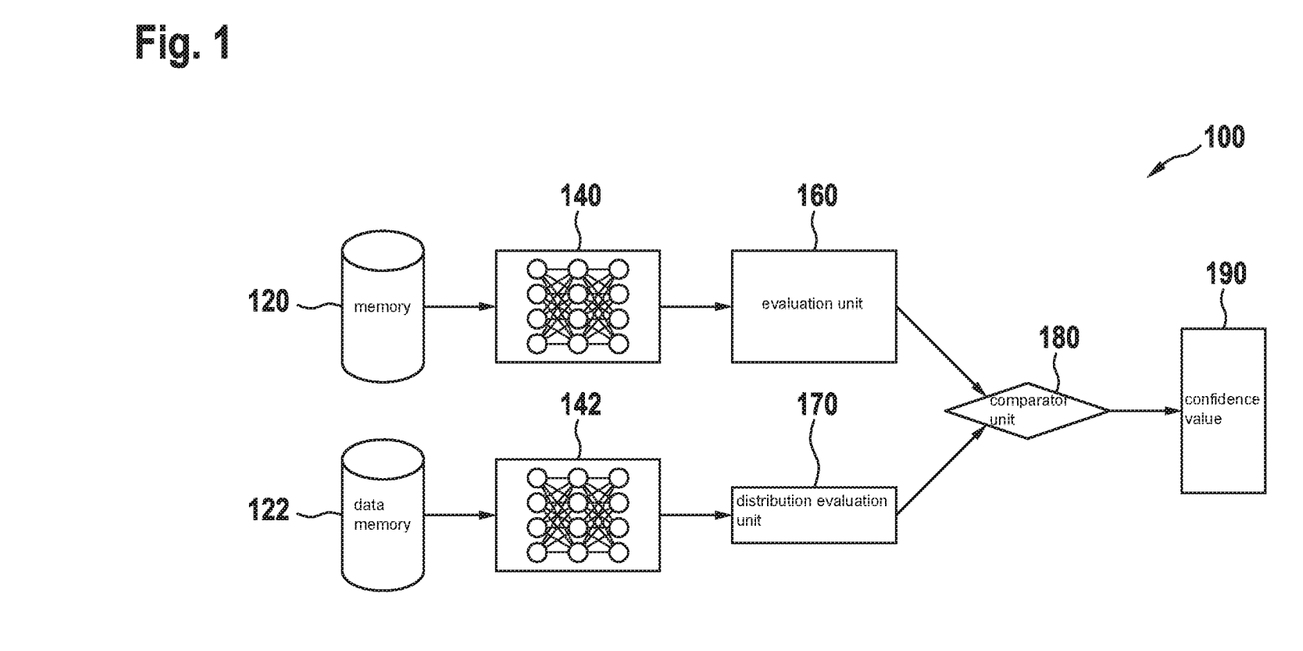
FIG. 1 shows a flow chart of the data streams of an example method in accordance with the present invention.

FIG. 1 outlines a data flow between components for determining a confidence value.

Neural network 140 is situated in the upper branch of data flow chart 100, which outlines the application case. For this purpose, data, for example from sensors, are provided as input images for the trained neural network 140 from various sources by way of a memory 120 so that for each of the input images neural network 140 is able to provide a plurality of output images of a hidden layer for the class of the detected object to an evaluation unit 160. Evaluation unit 160 produces an activation signature using the plurality of the output images of neural network 140 and scales the activation signature to the dimension of the input image. Evaluation unit 160 transmits the scaled activation signature to comparator unit 180.

In the lower branch of data flow chart 100, trained neural network 142 generates activation signatures. Neural network 140, 142 is trained to detect and to classify objects.

Data memory 122 provides trained neural network 142 with a training data set so that the neural network is able to generate a plurality of output images of a layer of the neural network for each input image of a plurality of input images.

Distribution evaluation unit 170 determines an activation signature for detected objects of a class in the plurality of the input images; scales each of the activation signatures to the dimension of the input image; scales each object portion of the object detected in the scaled activation signature to a uniform dimension; and calculates a probability distribution for each pixel of the scaled object portion of the scaled activation signatures using all of the detected objects of the same class of the training data set for determining the activation signature distribution.

Comparator unit 180 compares an object portion of the scaled activation signature with the activation signature distribution from the training data set for determining the confidence value 190.

Figure 2:
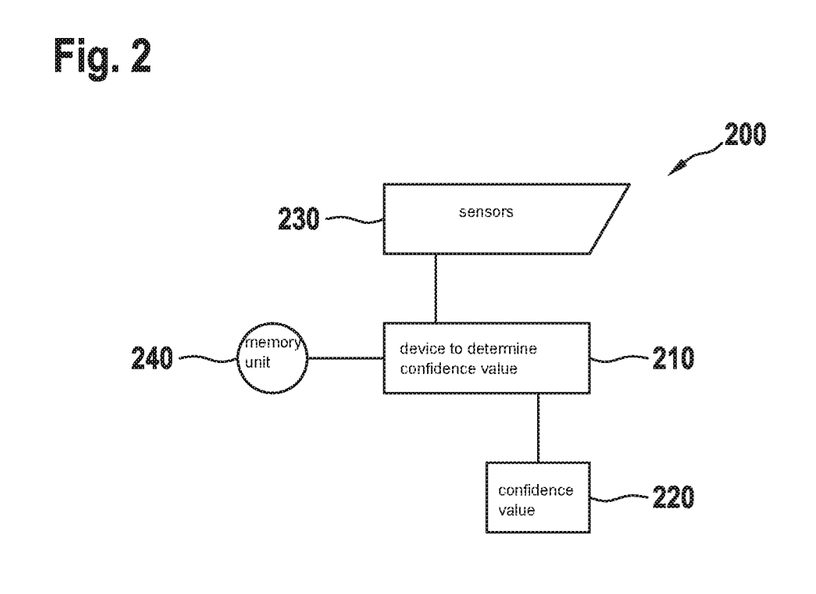
FIG. 2 shows an example system having a device that is designed to determine a confidence value in accordance with the present invention.

FIG. 2 outlines a system 200 having a device 210, which is designed to carry out the method for determining a confidence value, for example in the application case. Sensors 230 provide device 210 with input images and an activation signature distribution is stored in a memory unit 240 so that device 210 provides a confidence value 220 by way of the method described above.

Figure 3:
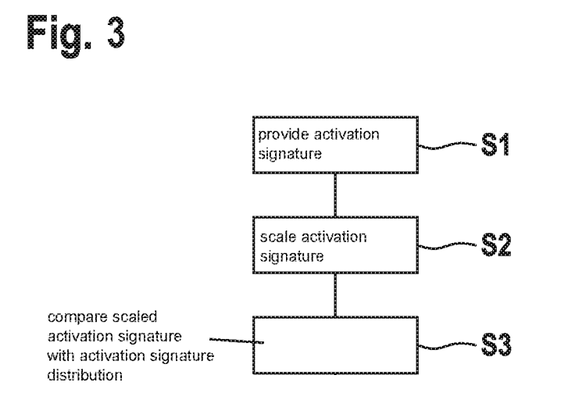
FIG. 3 shows the steps of the example method for determining the confidence value in accordance with the present invention.

FIG. 3 outlines the method for determining a confidence value, an activation signature being provided in a step S1 using a plurality of output images of a hidden layer of the neural network for the class of the detected object.

In another step S2, the activation signature is scaled to the dimension of the input image.

In a further step S3, an object portion of the scaled activation signature is compared with an activation signature distribution of all objects of the same class of a training data set of the neural network in order to determine the confidence value.

What is claimed is:

1. A method for determining a confidence value of an object of a class detected in an input image using a trained neural network, the method comprising:
   producing, using the neural network, an activation signature for the class of the detected object using a plurality of output images of a layer of the neural network, the input image being provided to an input of the neural network;
   scaling the activation signature to a dimension of the input image;
   comparing an object portion of the scaled activation signature with an activation signature distribution of all objects of the same class of a training data set of the neural network; and
   determining the confidence value based on the comparing;
   wherein the comparison for determining the confidence value is determined using a log-likelihood function of the object portion of the scaled activation signature in comparison with the activation signature distribution of the class of the detected object.

2. The method as recited in claim 1, wherein the object portion of the scaled activation signature includes a portion of the input image in which at least portions of the object of the same class were detected.

3. The method as recited in claim 1, wherein the object portion of the scaled activation signature includes a rectangular portion of the input image, which is constructed around the detected object of the class.

4. The method as recited in claim 1, wherein a signal is generated when the confidence value is smaller than a threshold value for the confidence value, the threshold value having been ascertained using training data or test data.

5. The method as recited in claim 1, wherein the confidence value is provided as a weighting factor for a situation analysis method.

6. The method as recited in claim 1, wherein a control signal for controlling an at least partially automated vehicle and/or a warning signal for warning a vehicle occupant is emitted as a function of a magnitude of the confidence value.

7. A method for determining a confidence value of an object of a class detected in an input image using a trained neural network, the method comprising:
producing, using the neural network, an activation signature for the class of the detected object using a plurality of output images of a layer of the neural network, the input image being provided to an input of the neural network;
scaling the activation signature to a dimension of the input image;
comparing an object portion of the scaled activation signature with an activation signature distribution of all objects of the same class of a training data set of the neural network; and
determining the confidence value based on the comparing;
wherein the activation signature of the detected object of a class is determined by performing the following:
calculating a respective relevance of each individual output image of the plurality of the output images of the layer of the neural network for classifying the detected object using a gradient process;
weighting each of the output images with its respective relevance;
combining the plurality of the weighted output images; and
applying an activation function to the combined plurality of the weighted output images to amplify features that have a positive influence on the classification to determine the activation signature.

8. The method as recited in claim 7, wherein: the production of the activation signature is performed respectively for each of the objects of the class, to thereby obtain a plurality of activation signatures; the at least one input image includes a plurality of input images of the training data set having associated classes of the objects in the respective input images; and the method further comprises determining the activation signature distribution by performing the following steps: with respect to each of the activation signatures, scaling the respective activation signature to a dimension of the respective input image, and scaling each object portion of the respective object detected in the scaled activation signature to a uniform dimension; and calculating a probability distribution for each pixel of the scaled object portion of the scaled activation signatures using all detected objects of the same class of the training data set, an average value and a variance being determined for each pixel of the scaled activation signatures for determining the activation signature distribution.

9. A method for determining a confidence value of an object of a class detected in an input image using a trained neural network, the method comprising:
producing, using the neural network, an activation signature for the class of the detected object using a plurality of output images of a layer of the neural network, the input image being provided to an input of the neural network;
scaling the activation signature to a dimension of the input image;
comparing an object portion of the scaled activation signature with an activation signature distribution of all objects of the same class of a training data set of the neural network; and
determining the confidence value based on the comparing;
wherein the activation signature of detected object of the class is determined by performing the following:
calculating the relevance of each individual output image of the plurality of the output images of the layer of the neural network, for classifying the detected object, by determining a gradient of a class output value of the neural network with respect to the output images of the plurality of output images;
averaging the gradient of the class output value across all pixels of the respective output image for determining a respective relevance of each individual output image of the plurality of the output images of the layer of the neural network;
weighting each of the output images with its respective relevance;
summing up all pixel values of the weighted output images that are situated in the weighted output images in corresponding positions; and
amplifying the summed up pixel values that have a positive influence on the classification by setting all negative values of the summed up pixel values to zero in to determine an activation signature.

10. The method as recited in claim 9, wherein: the production of the activation signature is performed respectively for each of the objects of the class, to thereby obtain a plurality of activation signatures; the at least one input image includes a plurality of input images of the training data set having associated classes of the objects in the respective input images; and the method further comprises determining the activation signature distribution by performing the following steps: with respect to each of the activation signatures, scaling the respective activation signature to a dimension of the respective input images, and scaling each object portion of the respective object detected in the scaled activation signature to a uniform dimension; and calculating a probability distribution for each pixel of the scaled object portion of the scaled activation signatures using all of the objects of the same class of the training data set, an average value and a variance being determined for each pixel of the scaled activation signatures for determining the activation signature distribution.

11. A method for determining a confidence value of an object of a class detected in an input image using a trained neural network, the method comprising:
producing, using the neural network, an activation signature for the class of the detected object using a plurality of output images of a layer of the neural network, the input image being provided to an input of the neural network;
scaling the activation signature to a dimension of the input image;
comparing an object portion of the scaled activation signature with an activation signature distribution of all objects of the same class of a training data set of the neural network; and determining the confidence value based on the comparing;
wherein each pixel of the object portion of the scaled activation signature is compared with every corresponding pixel of the activation signature distribution to determine a probability that a pixel of the object portion stems from a distribution of the same pixel of the activation signature distribution, and wherein the method further comprises calculating an average value of the probabilities for all pixels of the object portion, for determining the confidence value.

12. An apparatus, comprising:
a processor; and
a non-transitory machine-readable storage medium, on which is stored a computer program, which is executable by the processor, for determining a confidence value of an object of a class detected in an input image using a trained neural network, including:
  a program code arrangement having program code for determining a confidence value of an object of a class detected in an input image using a trained neural network by performing the following:
  producing, using the neural network, an activation signature for the class of the detected object using a plurality of output images of a layer of the neural network, the input image being provided to an input of the neural network;
  scaling the activation signature to a dimension of the input image;
  comparing an object portion of the scaled activation signature with an activation signature distribution of all objects of the same class of a training data set of the neural network; and
  determining the confidence value based on the comparing;
  wherein the comparison for determining the confidence value is determined using a log-likelihood function of the object portion of the scaled activation signature in comparison with the activation signature distribution of the class of the detected object.

13. A non-transitory machine-readable storage medium, on which is stored a computer program, which is executable by a processor, comprising:
  a program code arrangement having program code for determining a confidence value of an object of a class detected in an input image using a trained neural network, by performing the following:
  producing, using the neural network, an activation signature for the class of the detected object using a plurality of output images of a layer of the neural network, the input image being provided to an input of the neural network;
  scaling the activation signature to a dimension of the input image;
  comparing an object portion of the scaled activation signature with an activation signature distribution of all objects of the same class of a training data set of the neural network; and
  determining the confidence value based on the comparing;
  wherein the comparison for determining the confidence value is determined using a log-likelihood function of the object portion of the scaled activation signature in comparison with the activation signature distribution of the class of the detected object.

* * * * *